United States Patent
Oetlinger

(10) Patent No.: US 10,935,061 B2
(45) Date of Patent: Mar. 2, 2021

(54) THREE-SIDED CORNER ASSEMBLY

(71) Applicant: Blanking Systems, Inc., Grafton, WI (US)

(72) Inventor: Frank E. Oetlinger, Grafton, WI (US)

(73) Assignee: Blanking Systems, Inc., Grafton, WI (US)

( * ) Notice: Subject to any disclaimer, the term of this patent is extended or adjusted under 35 U.S.C. 154(b) by 520 days.

(21) Appl. No.: 15/764,145

(22) PCT Filed: Oct. 7, 2016

(86) PCT No.: PCT/US2016/055954
§ 371 (c)(1),
(2) Date: Mar. 28, 2018

(87) PCT Pub. No.: WO2017/062745
PCT Pub. Date: Apr. 13, 2017

(65) Prior Publication Data
US 2018/0283426 A1    Oct. 4, 2018

Related U.S. Application Data

(60) Provisional application No. 62/238,454, filed on Oct. 7, 2015.

(51) Int. Cl.
*F16B 7/18* (2006.01)
*F16B 12/02* (2006.01)
(Continued)

(52) U.S. Cl.
CPC .............. *F16B 7/185* (2013.01); *F16B 12/02* (2013.01); *F16B 12/10* (2013.01); *F16B 12/32* (2013.01);
(Continued)

(58) Field of Classification Search
CPC ............... A47B 47/0016; A47B 57/46; A47B 2230/0025; E04B 2001/1963; F16B 2/065;
(Continued)

(56) References Cited

U.S. PATENT DOCUMENTS 4,124,186 A * 11/1978 Call, Sr. .................. F16B 12/46
248/188
6,379,074 B1 * 4/2002 Chin ..................... F16B 7/0486
403/205
(Continued)

FOREIGN PATENT DOCUMENTS

DE       2619118 A * 11/1976 .............. F16B 12/30
FR    2523664 A1 *  9/1983 .............. F16B 12/30
(Continued)

OTHER PUBLICATIONS

JP No. 2018-518514, Office Action dated Oct. 27, 2020, 3 pages and English translation 3 pages.

*Primary Examiner* — Josh Skroupa
(74) *Attorney, Agent, or Firm* — Boyle Fredrickson, S.C.

(57) ABSTRACT

A corner assembly for interconnecting first and second frame members. A first plate member includes an outer face having a mounting rail projecting therefrom which is receivable in a slot in the first frame member and a bolt-receiving bore therethrough extending along a first axis at an acute angle to the outer face. A second plate member includes an outer face generally perpendicular to the outer face of the first plate member and having a mounting rail projecting therefrom which is receivable in a slot in a second frame member. The second plate member including a bolt-receiving bore therethrough extending along a second axis at an acute angle to the outer face of the second plate member. A central portion interconnects the first and second plate members and has a mounting surface and a bore extending
(Continued)

therethrough. The mounting surface including an alignment rail projecting therefrom. A corner has a first sidewall configured to abut a terminal end of the first frame member, a second sidewall configured to abut a terminal end of the second frame member, and a mounting wall having a slot therein adapted for receiving the alignment rail of the central portion.

24 Claims, 5 Drawing Sheets

(51) Int. Cl.
| | | |
|---|---|---|
| *F16B 12/10* | (2006.01) | |
| *F16B 12/30* | (2006.01) | |
| *F16B 12/32* | (2006.01) | |
| *F16B 12/50* | (2006.01) | |

(52) U.S. Cl.
CPC ...... *F16B 12/50* (2013.01); *A47B 2230/0025* (2013.01); *F16B 12/30* (2013.01)

(58) Field of Classification Search
CPC ........ F16B 7/044; F16B 7/048; F16B 7/0486; F16B 7/185; F16B 7/187; F16B 12/02; F16B 12/10; F16B 12/30; F16B 12/32; F16B 12/50; Y10T 403/3906; Y10T 403/42; Y10T 403/7105; Y10T 403/7117; Y10T 403/7158; Y10T 403/73

USPC ................ 403/188, 205, 385, 387, 394, 403
See application file for complete search history.

(56) References Cited

U.S. PATENT DOCUMENTS

| | | | |
|---|---|---|---|
| 9,945,409 B2* | 4/2018 | Katz | ........................ F16B 12/02 |
| 2003/0154838 A1 | 8/2003 | Oetlinger | |
| 2007/0157380 A1* | 7/2007 | Helmsderfer | ........... F16B 12/50 5/136 |
| 2014/0175236 A1* | 6/2014 | Nguyen | .................. F16B 12/46 248/163.1 |
| 2014/0250822 A1 | 9/2014 | Oetlinger | |
| 2015/0037091 A1 | 2/2015 | Richey | |
| 2017/0261022 A1* | 9/2017 | Schirmer | ................ F16B 12/50 |

FOREIGN PATENT DOCUMENTS

| | | | |
|---|---|---|---|
| GB | 476735 A | * 12/1937 | ............. F16B 12/02 |
| JP | S49-193810 | 12/1974 | |
| JP | S51-145670 | 11/1976 | |
| JP | 2013-525646 | 6/2013 | |
| KR | 10-2010-0016683 | 2/2010 | |
| KR | 10-2014-0121496 | 10/2014 | |
| WO | 2011/139507 | 11/2011 | |

* cited by examiner

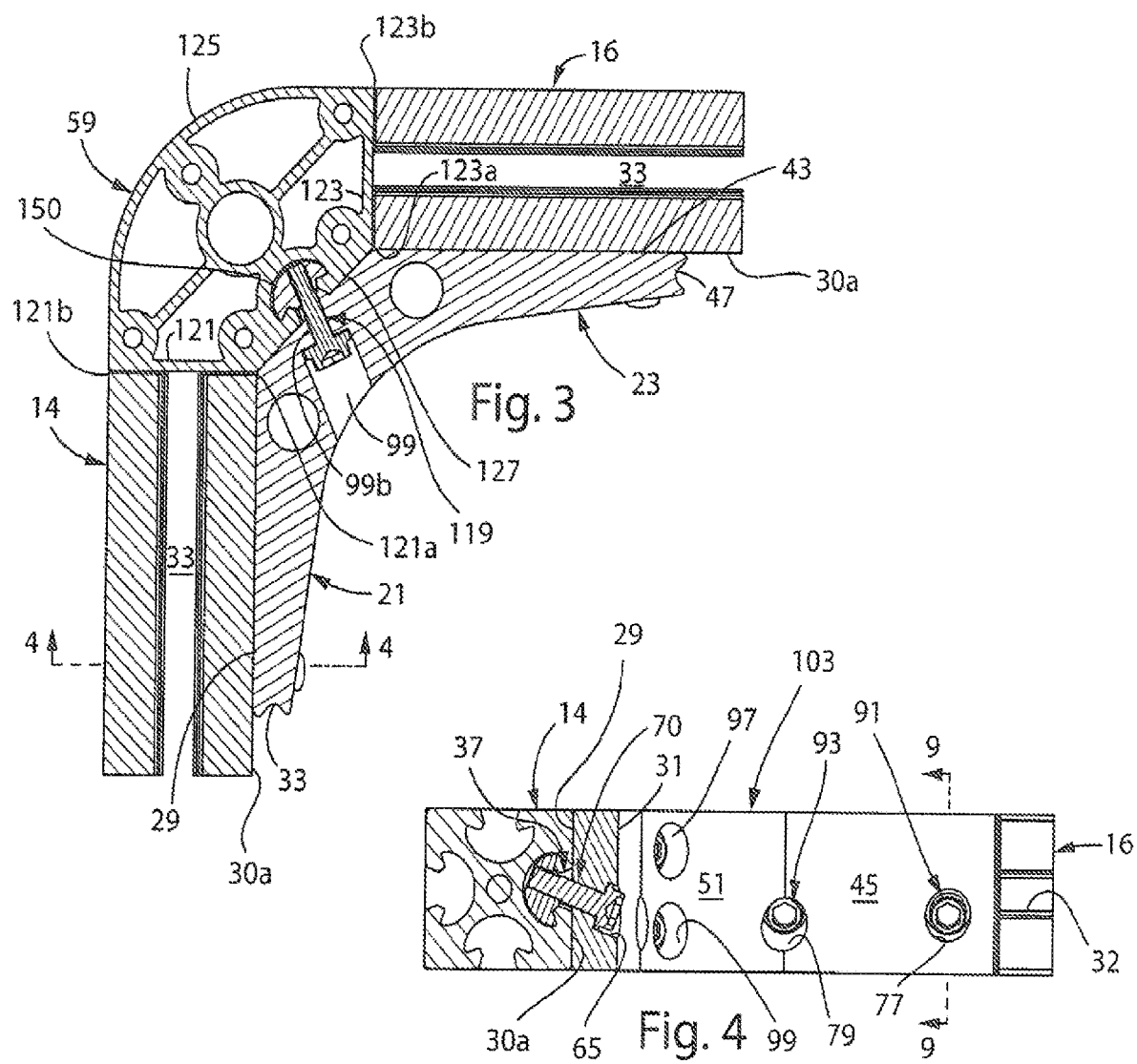
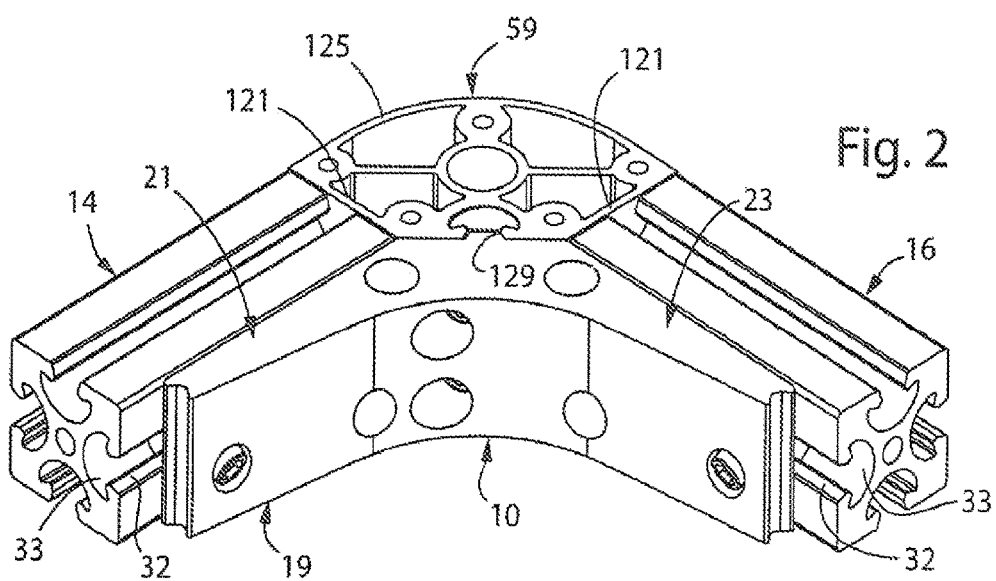

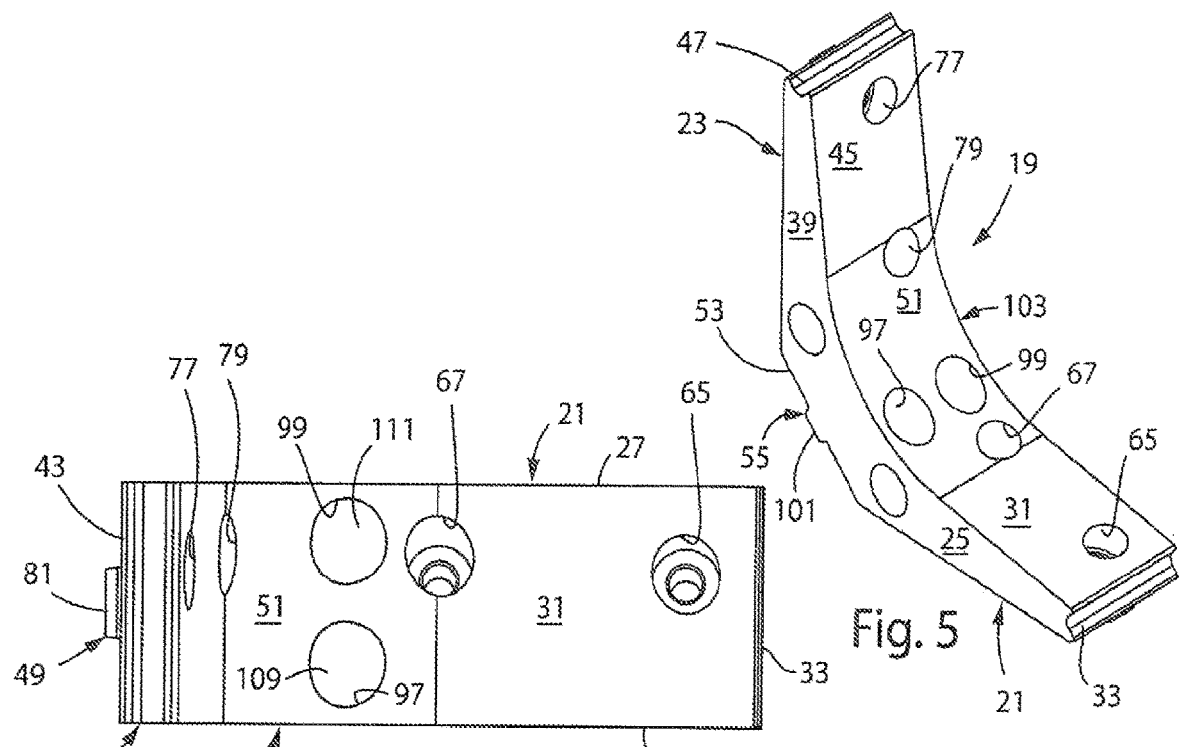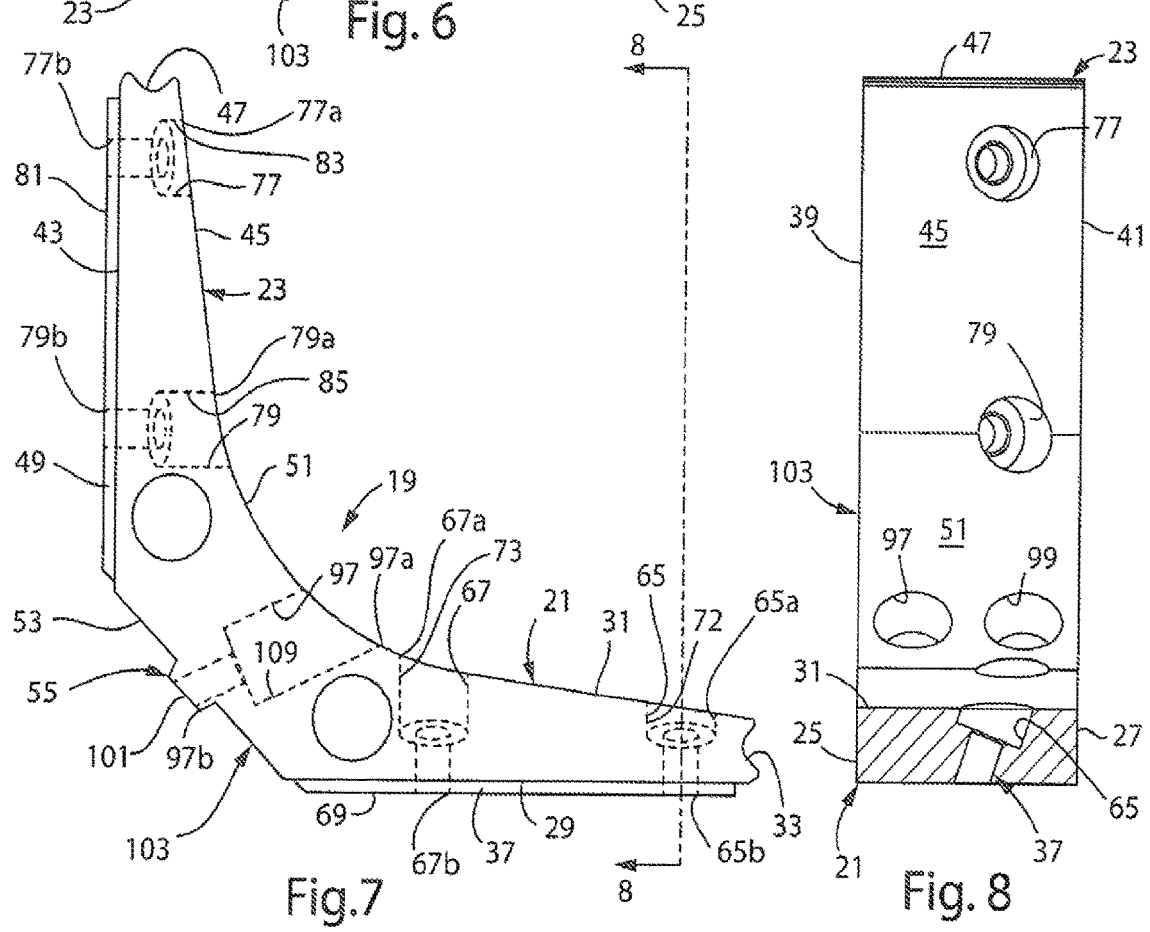

THREE-SIDED CORNER ASSEMBLY

FIELD OF THE INVENTION

This invention relates generally to frame assemblies that are used in the manufacture of automation equipment, buildings, furniture, and/or other components, and in particular, to a three-sided corner assembly for mechanically interlocking first and second frame members in such a matter as to prevent rotation of the frame members and the corner assembly during use.

BACKGROUND AND SUMMARY OF THE INVENTION

As is known, structural, frames are used in the construction of a wide variety of products, including everything from automation equipment and furniture to buildings and the like. Structural frames typically incorporate horizontal and vertical frame members tied together by corner pieces, joints or bonding. Coverings, such as panels, may be secured to the frame members to isolate the interior of the structural frames and/or to provide an aesthetically pleasing appearance. In addition, various components may be interconnected to the structural frame to allow the structural, frame to be used for its intended purpose. By way of example, hinges may be interconnected to the structural, frame to facilitate the mounting of a door thereto. Alternatively, sliders may be interconnected to the sides of a structural frame so as to allow the structural frame to function as a drawer. It can be appreciated that other types of components may be interconnected to the structural frame to facilitate the intended purpose thereof.

Typically, the components of a structural frame are held together by means of friction. For examples, nut and bolt combinations are often used to secure horizontal and vertical frame members together. However, the nut and bolt combinations holding the structural frames together often come loose over time when subjected to vibration and/or the environment. As the nut and bolt combinations loosen, the integrity of the structural frame may be compromised. Further, as the nut and bolt combinations loosen, the frame members and the components therefore rotate with respect to one another, thereby compromising the alignment of the structural frame.

Therefore, it is a primary object and feature of the present, invention to provide a three-sided corner assembly for mechanically interlocking first and second frame members in such a matter as to prevent rotation of the frame members and the corner piece during use.

It is a further object and feature of the present invention to provide a three-sided corner assembly for mechanically interlocking and self-aligning first and second frame members.

It is a still further object and feature of the present invention to provide a three-sided corner assembly for mechanically interlocking first and second frame members that is simple to utilize and adapted for a variety of uses.

In accordance with the present invention, a corner assembly is provided for interconnecting first and second frame members. The corner assembly includes a first plate member defining an inner face and an opposite outer face having a mounting rail projecting therefrom which is receivable in a slot in the first frame member. The first plate member includes a bolt-receiving bore therethrough extending along a first axis at an acute angle to the outer face. A second plate member defines an inner face and an opposite outer face generally perpendicular to the outer face of the first plate member and having a mounting rail projecting therefrom which is receivable in a slot in a second frame member. The second plate member includes a bolt-receiving bore therethrough extending along a second axis at an acute angle to the outer face of the second plate member. A central portion interconnects the first and second plate members and has a mounting surface and a bore extending therethrough. The mounting surface includes an alignment rail projecting therefrom. A corner has a first sidewall configured to abut a terminal end of the first frame member, a second sidewall configured to abut a terminal end of the second frame member, and a mounting wall having a slot therein. The slot is adapted for receiving the alignment rail of the central portion therein.

The corner extends along a corner axis and includes a corner cavity that extends parallel to the corner axis. A corner nut is receivable in the corner cavity and a bolt extends angularly through the bolt-receiving bore and engages the corner nut received in the corner cavity so to interconnect the central portion to the corner. The alignment rail includes a terminal end surface spaced from the mounting surface of the central portion. The alignment rail includes first and second alignment walls extending between the terminal end surface and the mounting surface of the central portion. The first and second alignment walls diverge from each other as the first and second alignment walls extend away from the terminal end surface. The bore through the central portion terminates an opening in communication with the terminal end surface. The bore extends along an axis at an acute angle to the mounting surface of the central portion. The central portion includes an arcuate surface having a first edge adjacent inner face of first plate member and a second edge adjacent the inner face of the second plate member.

Each of the first and second frame members has an outer surface, defines a longitudinal axis, and has a cavity communicating with the slot in a corresponding first and second frame member and extending parallel to the longitudinal axis. A first nut is receivable in the cavity of the first frame member and a first bolt extending angularly through the bolt-receiving bore in the first plate member and engages the first nut received in the cavity of the first frame member to interconnect the first plate member to first frame member. A second nut is receivable in the cavity of the second frame member and a second bolt extends angularly through the bolt-receiving bore in the second plate member and engaging the second nut received in the cavity of the second frame member to interconnect the second plate member to second frame member.

In accordance with a further aspect of the present invention, a connector is provided for interconnecting a first frame member, a second frame member and corner. Each of the first and second frame members extend along a corresponding axis and includes an outer surface having a slot therein and a cavity communicating with the slot. The corner has a first sidewall perpendicular to the axis of the first frame member and configured to abut a terminal end of the first frame member, a second sidewall perpendicular to the first sidewall and to the axis of the second frame member and configured to abut a terminal end of the second frame member, and a mounting wall having a slot therein extending along an axis perpendicular to the axes of the first and second frame members. The connector includes a first plate member having an inner face, an opposite outer face having a mounting rail projecting therefrom which is, receivable in the slot in the first frame member, and a bolt-receiving bore extending therethrough along a first axis at an acute angle to the outer face of the first plate member. A second plate member has an inner face, an opposite outer face having a mounting rail projecting therefrom which is receivable in the slot in a second frame member. The second plate member includes a bolt-receiving bore therethrough extending along a second axis at an acute angle to the outer face of the second plate member. A central portion interconnects the first and second plate members and has a mounting surface, an arcuate surface having, a first edge adjacent inner face of first plate member and a second edge adjacent the inner face of the second plate member, and a bore extending therethrough. The mounting surface includes an alignment rail projecting therefrom which is receivable in the slot in the corner.

The corner includes a cavity communicating with the slot. A corner nut is receivable in the cavity of the corner and a bolt extends angularly through the bore in the central portion and engages the corner nut so to interconnect the central portion to the corner. The alignment rail includes a terminal end surface spaced from the mounting surface of the central portion. The alignment rail includes first and second alignment walls extending between the terminal end surface and the mounting surface of the central portion. The first and second alignment walls diverge from each other as the first and second alignment walls extend away from the terminal end surface. The bore through the central portion terminates at an opening in communication with the terminal end surface. The bore extends along an axis at an acute angle to the mounting surface of the central portion.

A first nut is receivable in the cavity of the first frame member. A first bolt extends angularly through the bolt-receiving bore in the first plate member and engages the first nut received in the cavity of the first frame member to interconnect the first plate member to first frame member. A second nut is receivable in the cavity of the second frame member. A second bolt extends angularly through the bolt-receiving bore in the second plate member and engages the second nut received in the cavity of the second frame member to interconnect the second plate member to second frame member.

In accordance with a scull further aspect of the present invention, a frame assembly is provided. The frame assembly includes first and second frame members. Each of the first and second frame members extend along a corresponding axis and includes an outer surface having a slot therein and a cavity communicating with the slot. A corner has a first sidewall perpendicular to the axis of the first frame member and configured to abut a terminal end of the first frame member, a second sidewall perpendicular to the first sidewall and to the axis of the second frame member and configured to abut a terminal end of the second frame member, a mounting wall having a slot therein extending along an axis perpendicular to the axes of the first and second frame members, and a cavity communicating with the slot in the corner. A first plate member has an inner face, an opposite outer face having a mounting, rail projecting therefrom which is receivable in the slot in the first frame member, and a bolt receiving bore extending therethrough along a first axis at an acute angle to the outer face of the first plate member. A second plate member has an inner face, an opposite outer face having a mounting rail projecting therefrom which is receivable in the slot in a second frame member. The second plate member includes a bolt-receiving bore therethrough extending along a second axis at an acute angle to the outer face of the second plate member. A central portion interconnects the first and second plate members and has a mounting surface, an arcuate surface having a first edge adjacent inner face of first plate member and a second edge adjacent the inner face of the second plate member, and a bore extending therethrough. The mounting surface includes an alignment rail projecting therefrom which is receivable in the slot in the corner. A corner nut is receivable in the cavity of the corner. A corner bolt extends angularly through the bore in the central portion and engages the corner nut so to interconnect the central portion to the corner. A first nut is receivable in the cavity of the first frame member. A first bolt extends angularly through the bolt-receiving bore in the first plate member and engages the first nut received, in the cavity of the first frame member to interconnect the first plate member to first frame member. A second nut is receivable in the cavity of the second frame member. A second bolt extends angularly through the bolt-receiving bore in the second plate member and engages the second nut received in the cavity of the second frame member to interconnect the second plate member to second frame member.

The alignment rail includes a terminal end surface spaced from the mounting surface of the central portion. The alignment rail includes first and second alignment walls extending between the intersecting the terminal end surface and the mounting surface of the central portion. The first and second alignment walls diverge from each other as the first and second alignment walls extend away from the terminal end surface. The bore through the central portion terminates at an opening in communication with the terminal end surface. The bore extends along an axis at an acute angle to the mounting surface of the central portion.

BRIEF DESCRIPTION OF THE DRAWINGS

The drawings furnished herewith illustrate a preferred construction of the present invention in which the above advantages and features are clearly disclosed, as well as others which will be readily understood from the following description of the illustrated embodiment.

In the drawings:

FIG. 2 is an isometric view of the corner assembly of FIG. 1 interconnecting first and second frame members:

FIG. 3 is a cross-sectional view of the corner assembly of FIG. 2;

FIG. 4 is a cross-sectional view of the corner assembly of the present invention taken along line 4-4 of FIG. 3:

FIG. 5 is an isometric view of an L-shaped body of the corner assembly of the present invention;

FIG. 6 is a top plan view of the L-shaped body of the corner assembly of the present invention;

FIG. 7 is a side elevational view of the L-shaped body of the corner assembly of the present invention;

FIG. 8 is a cross-sectional view of the L-shaped body taken along line 8-8 of FIG. 7;

DETAILED DESCRIPTION OF THE DRAWINGS

Figure 1:
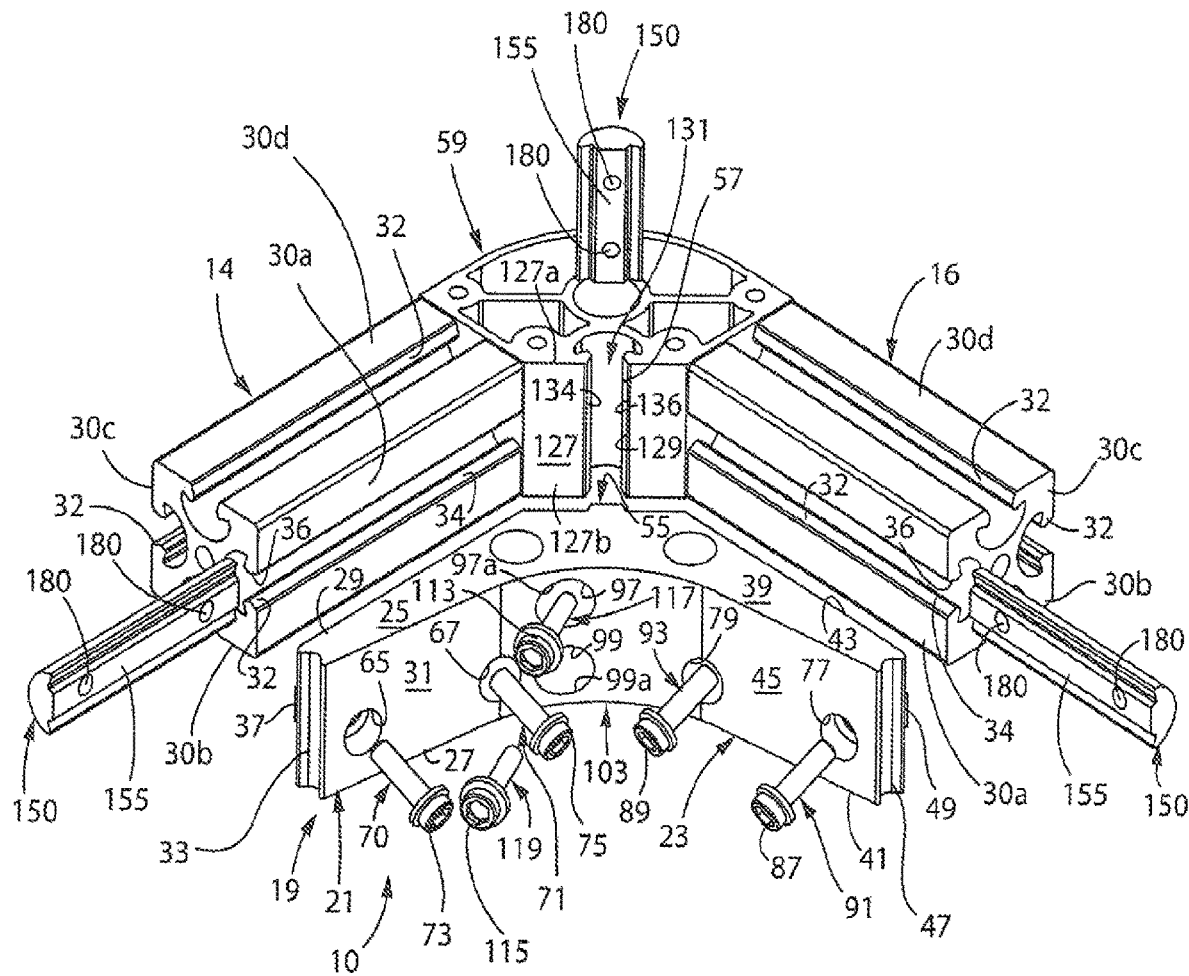
FIG. 1 is an exploded, isometric view of a corner assembly in accordance with the present invention for interconnecting first and second frame members.

Referring to FIGS. 1-3, a three-sided corner assembly in accordance with the present invention is generally designated by the numeral 10. As hereinafter described, it is intended for corner assembly 10 to interconnect first and second rails or frame members 14 and 16, respectively, of a frame assembly constructed from various components. Corner assembly 10 includes an L-shaped body 19 defined by first plate member 21 and second plate member 23. As best seen in FIGS. 5-8, first plate member 21 defines a substantially flat upper face 25, a substantially flat lower face 27, a substantially flat outer face 29 and a substantially flat inner face 31 which diverges from outer face 29. Outer and inner faces 29 and 31, respectively, are interconnected by terminal end face 33 having a generally concave configuration. Mounting rail 37 extends outwardly from outer face 29 in a longitudinal direction and along a central portion thereof. Mounting rail 37 has a perimeter shape that corresponds to a portion of a selected slot 32 in one of frame members 14 and 16, as hereinafter described. It is intended for the shape of mounting rail 37 to facilitate the nesting of mounting rail 37 into the select slot 32 in one of frame members 14 and 16, between the slot sidewalls 34 and 36, for reasons hereinafter described.

Similarly, second plate member 23 defines a substantially flat upper face 39, a substantially flat lower face 41, a substantially flat outer face 43 and a substantially flat inner face 45 which diverges from outer face 43. Outer and inner faces 43 and 45, respectively, are interconnected by terminal end face 47 having a generally concave configuration. Mounting rail 49 extends outwardly from outer face 43 in a longitudinal direction and along a central portion thereof. Mounting rail 49 has a perimeter shape that corresponds to a portion of a selected slot 32 in the other of frame members 14 or 16, as hereinafter described. It is intended for the shape of mounting rail 49 to facilitate the nesting of mounting rail 49 into the select slot 32 in the other of frame members 14 and 16, between the slot sidewalls 34 and 36, for reasons hereinafter described.

First plate member 21 has a pair of adjacent, upwardly extending, spaced bolt receiving bores 65 and 67 formed therethrough that extend between inner face 31 and outer face 29 thereof. Each bolt-receiving bore 65 and 67 extends angularly, in a transverse direction, through first plate member 21. More specifically, each bore 65 and 67 defines an axis generally parallel to the plane in which outer face 43 of second plate member 23 lies and is disposed at an acute angle with respect to outer face 29 of first plate member 21. It is preferred that the acute, angle fall in the range of 1° and 89°, but preferably between about 30° and about 80°, and is most preferably about 70°. Each bore 65 and 67 is defined by a corresponding first opening 65a and 67a, respectively, communicating with inner face 31 of first plate member 21 and a corresponding second end 65b and 67b, respectively, communicating with outer surface 69 of mounting rail 35. Bores 65 and 67 defines counter bore portions 72 and 73 adjacent inner face 31 of first plate member 21 which are adapted for receiving bolt heads 73 and 75 of corresponding bolts 70 and 71 therethrough. It is intended for bolts 70 and 71 to interconnect first plate member 21 to frame member 14, as hereinafter described.

Second plate member 23 also has a pair of adjacent, upwardly extending, spaced bolt receiving bores 77 and 79 formed therethrough that extend between inner face 45 and outer face 43 thereof. Each bolt-receiving bore 77 and 79 extends angularly, in a transverse direction, through second plate member 23. More specifically, each bore 77 and 79 defines an axis generally parallel to the plane in which outer face 29 of first plate member 21 lies and is disposed at an acute angle with respect to outer face 43 of second plate member 23. It is preferred that the acute angle fall in the range of 1° and 89°, but preferably between about 30° and about 80°, and is most preferably about 70°. Each bore 77 and 79 is defined by a corresponding, first opening 77a and 79a, respectively, communicating with inner face 45 of second plate member 23 and a corresponding second end 77b and 79b, respectively, communicating with outer surface 81 of mounting rail 49. Bores 77 and 79 define counter bore portions 83 and 85 adjacent inner face 45 of second plate member 23 which are adapted for receiving bolt heads 87 and 89 of corresponding bolts 91 and 93 therethrough. It is intended for bolts 91 and 93 to interconnect second plate member 23 to frame member 16, as hereinafter described.

Inner faces 31 and 45 of first and second plate members 21 and 23, respectively, are interconnected by a concave, arcuate surface 51 of central portion 103 of body 19. Central portion 103 of body 19 further includes a generally flat mounting surface 53 interconnecting outer faces 29 and 43 of first and second plate members 21 and 23, respectively. Mourning rail 55 extends outwardly from mounting surface 53 along a central portion thereof. Mounting rail 55 has a perimeter shape that corresponds to the portion of slot 57 in corner 59, as hereinafter described. It is intended for the shape of mounting rail 55 to facilitate the nesting of mounting rail 55 into the slot 129 of corner 59, between the slot sidewalls 134 and 136, for reasons hereinafter described.

Upper and lower, spaced, bolt receiving bores 97 and 99 extend between arcuate surface 51 and outer surface 101 of mounting rail 55 projecting from mounting surface 5. Each bolt-receiving bore 97 and 99 extends angularly, in a transverse direction, through central portion 103 of body 19. More specifically, each bore 97 and 99 defines an axis generally parallel to the planes in which upper and lower surfaces 105 and 107, respectively, of central portion 103 lie and is disposed at an acute angle with respect to mounting surface 53. It is preferred that the acute angle fall in the range of 1° and 89°, but preferably between about 30° and about 80°, and is most preferably about 70°. Each bore 97 and 99 is defined by a corresponding first opening 97a and 99a, respectively, communicating with arcuate surface 51 of central portion 103 of body 19 and a corresponding second end 97b and 99b (FIG. 3), respectively, communicating with outer surface 101 of mounting rail 55. Bores 97 and 99 define counter bore portions 109 and 111 adjacent arcuate surface 51 of central portion 103 of body 19 which are adapted for receiving bolt heads 113 and 115 of corresponding bolts 117 and 119, respectively, therethrough. It is intended for bolts 117 and 119 to interconnect central portion 103 of body 19 to corner 59, as hereinafter described.

Corner 59 includes first and second, generally flat sidewalls 121 and 123, respectively. First and second sidewalls 121 and 123, respectively, are generally perpendicular to each other and intended to abut the terminal ends of corresponding first and second frame members 14 and 16, respectively, FIGS. 1-3. First and second sidewalls 121 and 123, respectively, are defined by inner edges 121a and 123a, respectively, and outer edges 121b and 123b, respectively. Outer edges 121b and 123b of first and second sidewalls 121 and 123, respectively, are interconnected by a generally arcuate rear wall 125. Inner edges 121a and 123a of first and second sidewalls 121 and 123, respectively, are interconnected by a generally flat, mounting wall 127. It can be appreciated that corner 59 may be fabricated as a solid block of material or including a hub and spoke support system as best seen in FIGS. 1-3. Mounting wall 127 includes an elongated slot 129 formed therein that extends along the entire length thereof from upper edge 127a to lower edge 127b. Slot 129 opens into a longitudinally extending cavity 131 within corner 59. Slot 129 and cavity 131 are substantially symmetrical, whereby description of structures at one side of the slot 129 and/or cavity 131 are equally applicable to the corresponding structures on the other side of the slot 129 and/or cavity 131, only being mirror images thereof.

Figure 10:
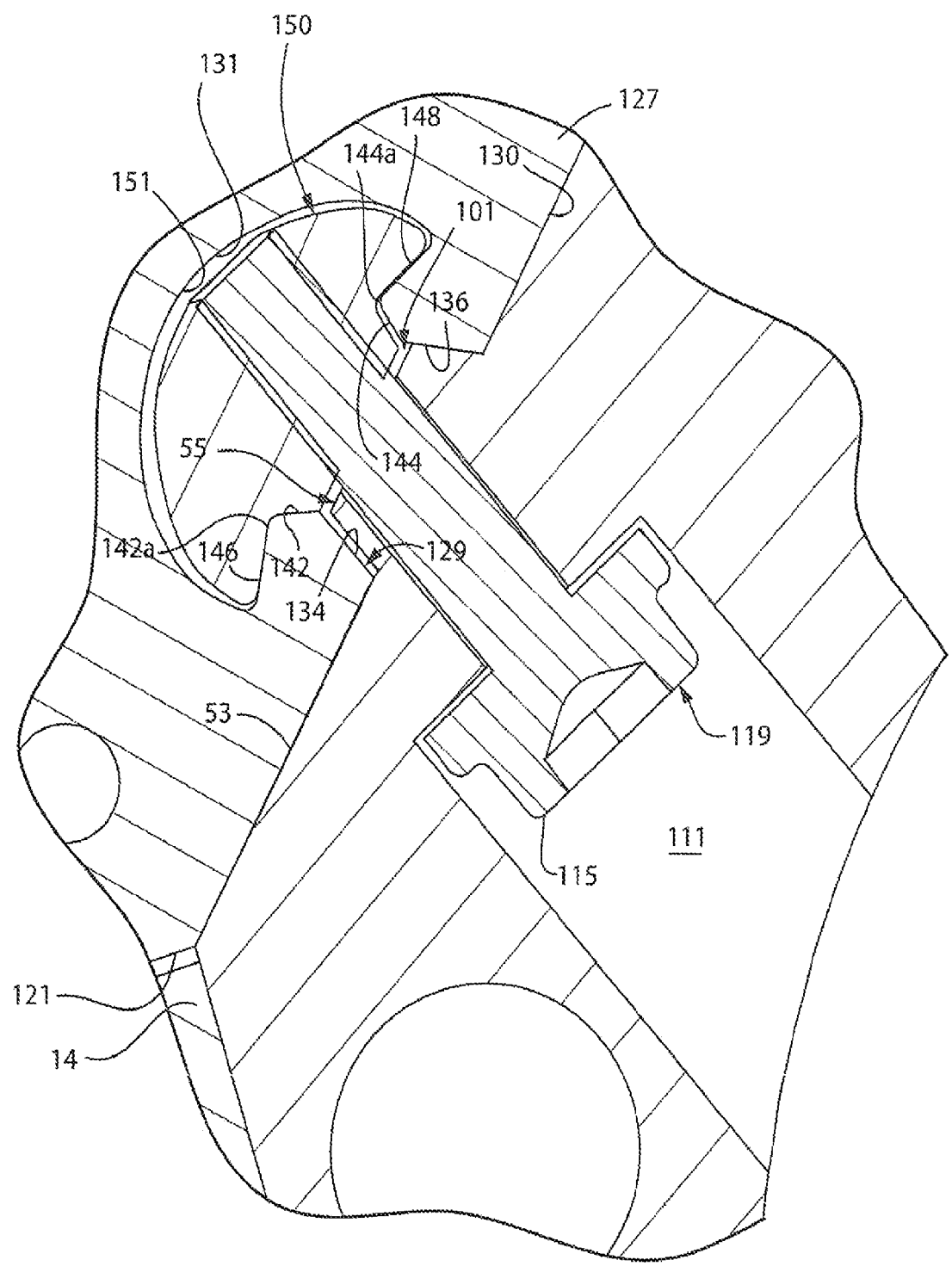
FIG. 10 is an enlarged, cross-sectional view showing a portion of the corner assembly of FIG. 3.

Referring to FIG. 10, slot 129 is defined between first and second sidewalls 134 and 136, respectively, extending from outer face 130 of mounting wall 127 at angles thereto. It is contemplated that the angles fall within the range of 1° and 89°, but is preferably between about 30° to about 80° and is most preferably about 70°. Correspondingly, in such a most preferred embodiment, each of the first and second sidewalls 134 and 136, respectively, defines an angle of about 20° with respect to an imaginary line that extends through the centerline of the slot 129, whereby the first and second sidewalls 134 and 136, respectively, define an angle of, about 40° between each other. Slot 129 is further defined between first and second outer abutment walls 142 and 144, respectively, which diverge from corresponding terminal edges 134a and 136a, respectively, of first and second, sidewalls 134 and 136, respectively. First outer abutment wall 142 angularly intersects first sidewall 134 to define an angle that is greater than 90° therebetween and second outer abutment wall 144 angularly intersects sidewall 136 to define an angle that is greater than 90° therebetween. Preferably, an angle defined between the first outer abutment wall 142 and the first sidewall 134 is between about 110° to about 160° and is most preferably about 130°.

From respective outermost portions, first and second inner abutment walls 146 and 148, respectively, define lines that extend angularly down and away from outer face 130, toward a middle portion of the cavity 131. Stated another way, from the inner lands 142a and 144a that connect the first and second outer abutment walls 142 and 144, respectively, to corresponding first and second inner abutment walls 146 and 148, respectively, the first and second inner abutment walls 146 and 148, respectively, extend in opposing directions that diverge from each other and toward outer face 130. Inner land 142a defines a flat surface that defines an edge at the intersection of land 142a with corresponding outer and inner abutment walls 142 and 146, respectively. Similarly, inner land 144a defines a flat surface that defines an edge at the intersection of land 144a with corresponding outer and inner abutment walls 144 and 148, respectively. First and second outer abutment walls 142 and 144, respectively, are at steeper angles or relatively closer to orthogonal with respect to outer face 130 than are first and second inner abutment walls 146 and 148, respectively, which are relatively closer to parallel with respect to outer face 130. First and second outer abutment walls 142 and 144, respectively, in one preferred embodiment, define angles of about 60° with respect to outer face 130 whereas first and second inner abutment walls 146 and 148 of this embodiment define angles of about 20° or 19° with respect to outer face 130. Concave terminal wall 151 extends between terminal edges 146a and 148a, respectively, of first and second inner abutment walls 146 and 148, respectively, and the cavity 131 is defined between inner abutment walls 146 and 148 and concave terminal wall 151.

Figure 9:
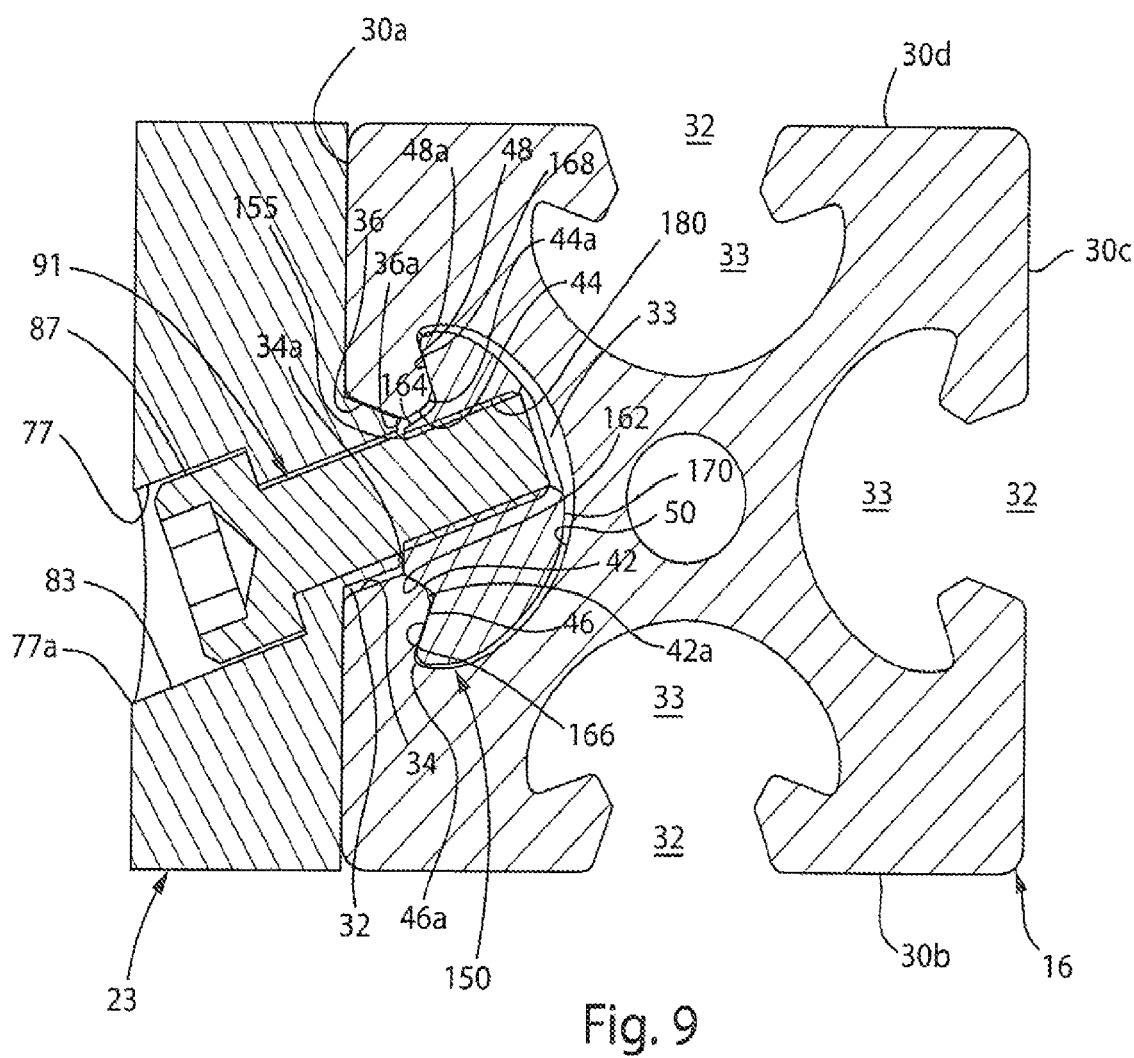
FIG. 9 is a cross-sectional view of the corner assembly of the present invention taken along line 9-9 of FIG. 4.

As heretofore described, it is intended for corner assembly 10 to interconnect first and second rails or frame members 14 and 16, respectively, of a frame assembly constructed from various components. First and second frame members 14 and 16, respectively, are identical in structure. As such, the description of second frame member 16 hereinafter provided is understood to describe the structure of first frame member 14 as if fully described herein. Referring to FIG. 9, in the depicted embodiment, it can be appreciated that frame member 16 has a generally square configuration or cross-sectional profile shape and extends along a longitudinal axis. In alternate embodiments, frame members 14 and 16 may have different cross-sectional profile shapes, for example, round, rectangular, triangular, or some other polygonal shape (not illustrated), depending on the desired end-use configuration. Frame member 16 has an outer surface that is defined by four faces 30a-30d, Each face 30a-30d is identical in structure and, as such, the description hereinafter of face 30a is understood to describe faces 30b-30d, as if fully described herein.

Each face 30a-30d of frame member 16 is generally flat and includes a slot 32 formed therein that extends along the entire length thereof and that opens into a longitudinally extending cavity 33. Slot 32 and cavity 33 are substantially symmetrical, whereby description of structures at one side of the slot 32 and/or cavity 33 are equally applicable to the corresponding structures on the other side of the slot 32 and/or cavity 33, only being mirror images thereof.

Slot 32 is defined between first and second sidewalls 34 and 36, respectively, extending from face 30a at angles thereto. It is contemplated that the angles fall within the range of 1° and 89°, but is preferably between about 30° to about 80° and is most preferably about 70°. Correspondingly, in such a most preferred embodiment, each of the first and second sidewalls 34 and 36, respectively, defines an angle of about 20° with respect to an imaginary line that extends through the centerline of the slot 32, whereby the first and second sidewalls 34 and 36, respectively, define an angle of about 40° between each other. Slot 32 is further defined between first and second outer abutment walls 42 and 44, respectively, which diverge from corresponding terminal edges 34a and 36a, respectively, of first and second sidewalls 34 and 36, respectively. First outer abutment wall 42 angularly intersects first sidewall 34 to define an angle that is greater than 90° therebetween and second outer abutment wall 44 angularly intersects sidewall 36 to define an angle that is greater than 90° therebetween. Preferably, an angle defined between the first outer abutment wall 42 and the first sidewall 34 is between about 110° to about 160° and is most preferably about 130°.

From respective outermost portions, first and second inner abutment walls 46 and 48, respectively, define lines that extend angularly down and away from the face 30a, toward a middle portion of the cavity 33. Stated another way, from the inner lands 42a and 44a that connect the first and second outer abutment walls 42 and 44, respectively, to corresponding first and second inner abutment walls 46 and 48, respectively, the first and second inner abutment walls 46 and 48, respectively, extend in opposing directions that diverge from each other and toward the face 30a. Inner land 42a defines a flat surface that defines an edge at the intersection of land 42a with corresponding outer and inner abutment walls 42 and 46, respectively. Similarly, inner land 44a defines a flat surface that defines an edge at the intersection of land 44a with corresponding outer and inner abutment walls 44 and 48, respectively. First, and second outer abutment walls 42 and 44, respectively, are at steeper angles or relatively closer to orthogonal with respect to the face 30a than are first and second inner abutment walls 46 and 48, respectively, which are relatively closer to parallel with respect to the face 30a. First and second outer abutment walls 42 and 44, respectively, in one preferred embodiment, define angles of about 60° with respect to the face 30a, whereas first and second inner abutment walls 46 and 48 of this embodiment define angles of about 20° or 19° with respect to the face 30a. Concave terminal wall 50 extends between terminal edges 46a and 48a, respectively, of first and second inner abutment walls 46 and 48, respectively, and the cavity 33 is defined between the inner abutment walls 46, 48 and the concave terminal wall 50.

Referring back to FIGS. 1-3, in order to body 19 to corner 59 and to first and second frame members 14 and 16, respectively, nuts 150 are provided. Each nut 150 has a substantially planar upper wall 155 and a pair of outwardly tapering sidewalls 162 and 164. Tapering sidewalls 162 and 164 extend angularly from upper wall 155 at angles that correspond to the angles of outer abutment walls 42 and 44 in first and second frame members 14 and 16, respectively, and to the angles of outer abutment walls 42 and 44 in corner 59. A distance between the tapering sidewalls 162 and 164 is smaller than a distance between the outer abutment walls 42 and 44 so that, during use, a clearance is defined between the tapering sidewall 162 and outer abutment wall 42 in a manner that is described in more detail elsewhere herein. Similarly, the distance between the tapering sidewalls 162 and 164 is smaller than a distance between the outer abutment walls 142 and 144 of corner so that, during use a clearance is defined between the tapering sidewall 162 and outer abutment wall 142 in a manner that is described in more detail elsewhere herein, A pair of shoulders 166 and 168 extends outwardly from lower portions of the tapering sidewalls 162 and 164 and upwardly in a direction of the upper wall 155.

It is contemplated for shoulders 166 and 168 of each nut 150 extend at angles that generally correspond to the angles defined between inner abutment walls 46 and 48 and outer abutments walls 42 and 44 of first and second frame members 14 and 16, respectively, and to the angles defined between inner abutment walls 146 and 148 and outer abutments walls 142 and 144 of corner 59. It is preferred, that the angles are obtuse angles, falling in the range of 91° and 179°, but preferably between about 95° and 105°, and is more preferably about 100°. Angles (not labeled) between shoulder 166 and a longitudinal axis of each bore 180, and between shoulder 168 and a longitudinal axis of each bore 180 are different. For example, the angle between shoulder 166 and the longitudinal axes of bores 180 may be approximately 90°, and the angle between shoulder 168 and the longitudinal axes of bores 180 may be approximately 55°. A lower curved wall 170 extends along an arcuate path between and connects outer ends of the shoulders 166 and 168. The profile shape and radius of curvature of the lower curved wall 170 of the nut 150 correspond to the characteristics of the concave terminal walls 50 that define the lower periphery of cavities 33 in first and second frame members 14 and 16, respectively, and to the characteristics of the concave terminal wall 151 that define the lower periphery of cavity 131 in corner 59.

Each nut 150 further includes a pair of threaded bores 180 that are spaced from each other along the length of the nut 150. Bores 180 extend orthogonally through the nut 150 in a longitudinal direction of the nut 150 and angularly in a transverse direction of the nut 150. Bores 180 extend at the same angles at which bores 65 and 67 extend through first plate member 21, at which bores 77 and 79 extend though second plate member 23, and at which bores 97 and 99 extend though central portion 103, namely, transversely at acute angles. Each of such acute angles of bores 180 falls in the range of 1° and 89°, but is preferably between about 30° and about 80°, and is most preferably about 65° with respect to the upper wall 155 of the nut 150. In this configuration, each bore 180 has an upper opening that is substantially at a centerline of the nut 150 and a lower opening that is offset from the centerline of the nut, being positioned below the outwardly tapered sidewall 162.

In order to interconnect first and second frame members 14 and 16, respectively, with corner assembly 10, a first nut 150 is slid longitudinally into cavity 131 of corner 59. Mounting rail 55 extending outwardly from mounting, surface 53 of central portion 103 of body 19 is slid into slot 129 in outer face 130 of mounting wall 127 of corner 59. Central portion 103 of body 19 and nut 150 are slid lengthwise through the slot 129 and cavity 131, respectively, until body 19 is in a desired position and bores 97 and 99 extending though central portion 103 are aligned with the pair of bores 180 of the nut 150. Bolts 117 and 119 are inserted through bores 97 and 99 in central portion 103 and are threaded into threads bores 180 of the nut 150.

The tightening of bolts 117 and 119 into nut 150 provides multi-axial tightening to the joint in a manner that clamps the stack of nut 150, corner 59 and central portion 103 of body 19 together and transversely compresses corner 59. Tightening each bolt 117 and 119 draws the nut 150 by advancing the nut 150 along the threads of bolts 117 and 119. This pulls the nut 150 angularly up and across the cavity 131, toward the outer abutment wall 144 of slot 129. The shoulder 166 engages the inner abutment wall 146 of cavity 131, while the nut 150 is being drawn angularly up and across the cavity 131, which establishes a clearance between the outer abutment wall 142 of corner 59 and tapering sidewall 162. Such clearance provides enough space for the nut 150 to pivot within the cavity 131. This is done by further tightening bolt 117 and 119 after the shoulder 166 engages the inner abutment wall 146 so that further advancing nut 150 along bolts 117 and 119 pivots the nut 150 about the inner land 142a between the inner and outer abutment walls 146 and 142, respectively. Nut 150 then pivots about the inner land 142a until the shoulder 168 engages the inner abutment wall 148 of cavity 131. When both shoulders 166 and 168 of the nut 150 are engaging the inner abutment walls 146 and 148 of corner 59, further tightening of bolts 117 and 119 moves nut 150 closer to central portion 103 of body 19. This urges the inner abutment walls 146 and 148 closer to each other, transversely compressing corner 59 because of the wedging action between the inner abutment walls 146 and 148 and shoulders 166 and 168 that slides the inner abutment walls 146 and 148 across the shoulders 166 and 168 and toward the tapering sidewalls 162 and 164 of nut 150. This also provides a clamping force that squeezes corner 59 between central portion 103 of body 19 and nut 150 while tensioning bolts 117 and 119.

To connect first frame member 14 to first plate member 21 of corner assembly 10, a second nut 150 is slid longitudinally into the cavity 33 of in one of the faces, e.g. face 30a, of frame member 14. Mounting rail 34 of first plate member 21 is slid into the slot 32 of the face 30a of frame member 14. First plate member 21 of corner assembly 10 and nut 150 are slid lengthwise through the slot 32 and cavity 33 of frame member 14, respectively, until corner assembly 10 is in the desired position and bores 65 and 67 through first plate member 14 align with the pair of bores 180 in nut 150. Bolts 70 and 71 are inserted through the unthreaded bores 65 and 67, respectively, and are threaded into threads bores 180 of the nut 150.

The tightening of bolts 70 and 71 into nut 150 provides multi-axial tightening to the joint in a manner that clamps the stack of nut 150, first frame member 14, and first plate member 14 of corner assembly 10 together and transversely compresses frame member 14. Tightening each bolt 70 and 71 draws the nut 150 by advancing the nut 150 along the threads of bolts 117 and 119. This pulls the nut 150 angularly up and across the cavity 33, toward the outer abutment wall 44 of slot 32. Shoulder 166 engages the inner abutment wall 46 of cavity 33 while the nut 150 is being drawn angularly up and across the cavity 33, which establishes a clearance between the outer abutment wall 42 of first frame member 14 and tapering sidewall 162. Such clearance provides enough space for the nut 150 to pivot within the cavity 33. This is done by further tightening bolts 70 and 71 after the shoulder 166 engages the inner abutment wall 46 so that further advancing the nut 150 along bolts 70 and 71 pivots the nut 150 about the inner land 42a between the inner and outer abutment walls 46 and 42. Nut 150 then pivots about inner land 42a until the shoulder 168 engages the inner abutment wall 48 of cavity 33. When both shoulders 166 and 168 of the nut 150 are engaging the inner abutment walls 46 and 48 of first frame member 14, further tightening of bolts 70 and 71 moves nut 150 closer to corner assembly 10. This urges the inner abutment walls 46 and 48 closer to each other, transversely compressing first frame member 14 because of the wedging action between the inner abutment walls 46 and 48 and shoulders 166 and 168 that slides the inner abutment walls 46 and 48 across the shoulders 166 and 168 and toward the tapering sidewalk 162 and 164 of the nut 150. This also provides a clamping force that squeezes first frame member 14 between first plate member 21 of corner assembly 10 and nut 150 while tensioning bolts 70 and 71.

To connect second frame member 16 to second plate member 23 of corner assembly 10, mounting rail 49 of second plate member 23 of corner assembly 10 is slid into slot 32 of a face, e.g. face 30a of second frame member 16, FIG. 9. The procedure for tightening bolts 91 and 93 into a nut 150 to provide multi-axial, tightening of the joint as described above is repeated so as to clamp second frame member 16 between second plate member 23 of corner assembly 10 and nut 150 and arrive at an assemblage of corner assembly 10 and first and, second frame members 14 and 16, respectively, FIG. 2.

Various modes of carrying out the invention are contemplated as being within the scope of the following claims particularly pointing out and distinctly claiming the subject matter, which is regarded as the invention.

I claim:

1. A corner assembly for interconnecting first and second frame members, comprising:
   a first plate member defining an inner face and an opposite outer face having a mounting rail projecting therefrom which is receivable in a slot in the first frame member, the first plate member including a bolt-receiving bore therethrough extending along a first axis at an acute angle to the outer face;
   a second plate member defining an inner face and an opposite outer face generally perpendicular to the outer face of the first plate member and having a mounting rail projecting therefrom which is receivable in a slot in a second frame member, the second plate member including a bolt-receiving bore therethrough extending along a second axis at an acute angle to the outer face of the second plate member;
   a central portion interconnecting the first and second plate members and having a mounting surface and a bore extending therethrough, the mounting surface including an alignment rail projecting therefrom; and
   a corner having a first sidewall configured to abut a terminal end of the first frame member, a second sidewall configured to abut a terminal end of the second frame member, and a mounting wall having a slot therein, the slot adapted for receiving the alignment rail of the central portion therein.

2. The corner assembly of claim 1 wherein the corner extends along a corner axis and includes a corner cavity that extends parallel to the corner axis and wherein the corner assembly further comprises a corner nut receivable in the corner cavity.

3. The corner assembly of claim 2 further comprising a bolt that extends angularly through the bolt-receiving bore and engages the corner nut received in the corner cavity so to interconnect the central portion to the corner.

4. The corner assembly of claim 1 wherein the alignment rail includes a terminal end surface spaced from the mounting surface of the central portion.

5. The corner assembly of claim 4 wherein the alignment rail includes first and second alignment walls extending between the terminal end surface and the mounting surface of the central portion.

6. The corner assembly of claim 5 wherein the first and second alignment walls diverge from each other as the first and second alignment walls extend away from the terminal end surface.

7. The corner assembly of claim 4 wherein the bore through the central portion terminates an opening in communication with the terminal end surface.

8. The corner assembly of claim 7 wherein the bore extends along an axis at an acute angle to the mounting surface of the central portion.

9. The corner assembly of claim 1 wherein the central portion includes an arcuate surface having a first edge adjacent inner face of first plate member and a second edge adjacent the inner face of the second plate member.

10. The corner assembly of claim 1 wherein each of the first and second frame members has an outer surface, defines a longitudinal axis, and has a cavity communicating with the slot in a corresponding first and second frame member and extending parallel to the longitudinal axis, and wherein the corner assembly further comprising:
    a first nut receivable in the cavity of the first frame member;
    a first bolt extending angularly through the bolt-receiving bore in the first plate member and engaging the first nut received in the cavity of the first frame member to interconnect the first plate member to first frame member;
    a second nut receivable in the cavity of the second frame member; and
    a second bolt extending angularly through the bolt-receiving bore in the second plate member and engaging the second nut received in the cavity of the second frame member to interconnect the second plate member to second frame member.

11. A connector for interconnecting a first frame member, a second frame member and corner, each of the first and second frame members extending along a corresponding axis and including an outer surface having a slot therein and a cavity communicating with the slot and the corner having a first sidewall perpendicular to the axis of the first frame member and configured to abut a terminal end of the first frame member, a second sidewall perpendicular to the first sidewall and to the axis of the second frame member and configured to abut a terminal end of the second frame member, and a mounting wall having a slot therein extending along an axis perpendicular to the axes of the first and second frame members, the connector comprising:

a first plate member having an inner face, an opposite outer face having a mounting rail projecting therefrom which is receivable in the slot in the first frame member, and a bolt-receiving bore extending therethrough along a first axis at an acute angle to the outer face of the first plate member;

a second plate member having an inner face, an opposite outer face having a mounting rail projecting therefrom which is receivable in the slot in a second frame member, the second plate member including a bolt-receiving bore therethrough extending along a second axis at an acute angle to the outer face of the second plate member; and a central portion interconnecting the first and second plate members and having a mounting surface, an arcuate surface having a first edge adjacent inner face of first plate member and a second edge adjacent the inner face of the second plate member, and a bore extending therethrough, the mounting surface including an alignment rail projecting therefrom which is receivable in the slot in the corner.

12. The connector of claim 11 wherein the corner includes a cavity communicating with the slot and wherein the connector further comprises a corner nut receivable in the cavity of the corner and a bolt extending angularly through the bore in the central portion and engaging the corner nut so to interconnect the central portion to the corner.

13. The connector of claim 11 wherein the alignment rail includes a terminal end surface spaced from the mounting surface of the central portion.

14. The connector of claim 13 wherein the alignment rail includes first and second alignment walls extending between the terminal end surface and the mounting surface of the central portion.

15. The connector of claim 14 wherein the first and second alignment walls diverge from each other as the first and second alignment walls extend away from the terminal end surface.

16. The connector of claim 13 wherein the bore through the central portion terminates at an opening in communication with the terminal end surface.

17. The connector of claim 16 wherein the bore extends along an axis at an acute angle to the mounting surface of the central portion.

18. The connector of claim 11 further comprising:
a first nut receivable in the cavity of the first frame member;
a first bolt extending angularly through the bolt-receiving bore in the first plate member and engaging the first nut received in the cavity of the first frame member to interconnect the first plate member to first frame member;
a second nut receivable in the cavity of the second frame member; and
a second bolt extending angularly through the bolt-receiving bore in the second plate member and engaging the second nut received in the cavity of the second frame member to interconnect the second plate member to second frame member.

19. A frame assembly, comprising:
first and second frame members, each of the first and second frame members extending along a corresponding axis and including an outer surface having a slot therein and a cavity communicating with the slot;
a corner having a first sidewall perpendicular to the axis of the first frame member and configured to abut a terminal end of the first frame member, a second sidewall perpendicular to the first sidewall and to the axis of the second frame member and configured to abut a terminal end of the second frame member, a mounting wall having a slot therein extending along an axis perpendicular to the axes of the first and second frame members, and a cavity communicating with the slot in the corner;

a first plate member having an inner face, an opposite outer face having a mounting rail projecting therefrom which is receivable in the slot in the first frame member, and a bolt-receiving bore extending therethrough along a first axis at an acute angle to the outer face of the first plate member;

a second plate member having an inner face, an opposite outer face having a mounting rail projecting therefrom which is receivable in the slot in the second frame member, the second plate member including a bolt-receiving bore therethrough extending along a second axis at an acute angle to the outer face of the second plate member;

a central portion interconnecting the first and second plate members and having a mounting surface, an arcuate surface having a first edge adjacent inner face of first plate member and a second edge adjacent the inner face of the second plate member, and a bore extending therethrough, the mounting surface including an alignment rail projecting therefrom which is receivable in the slot in the corner;

a corner nut receivable in the cavity of the corner;

a corner bolt extending angularly through the bore in the central portion and engaging the corner nut so to interconnect the central portion to the corner;

a first nut receivable in the cavity of the first frame member;

a first bolt extending angularly through the bolt-receiving bore in the first plate member and engaging the first nut received in the cavity of the first frame member to interconnect the first plate member to first frame member;

a second nut receivable in the cavity of the second frame member; and a second bolt extending angularly through the bolt-receiving bore in the second plate member and engaging the second nut received in the cavity of the second frame member to interconnect the second plate member to second frame member.

20. The frame assembly of claim 19 wherein the alignment rail includes a terminal end surface spaced from the mounting surface of the central portion.

21. The frame assembly of claim 20 wherein the alignment rail includes first and second alignment walls extending between the terminal end surface and the mounting surface of the central portion.

22. The frame assembly of claim 21 wherein the first and second alignment walls diverge from each other as the first and second alignment walls extend away from the terminal end surface.

23. The frame assembly of claim 20 wherein the bore through the central portion terminates at an opening in communication with the terminal end surface.

24. The frame assembly of claim 19 wherein the bore extends along an axis at an acute angle to the mounting surface of the central portion.

* * * * *